(12) United States Patent
Minami et al.

(10) Patent No.: US 10,886,534 B2
(45) Date of Patent: Jan. 5, 2021

(54) NEGATIVE-ELECTRODE ACTIVE MATERIAL FOR NON-AQUEOUS ELECTROLYTE SECONDARY BATTERY AND NON-AQUEOUS ELECTROLYTE SECONDARY BATTERY

(71) Applicant: Sanyo Electric Co., Ltd., Daito (JP)

(72) Inventors: Hiroshi Minami, Hyogo (JP); Taizou Sunano, Tokushima (JP)

(73) Assignee: SANYO Electric Co., Ltd., Daito (JP)

( * ) Notice: Subject to any disclaimer, the term of this patent is extended or adjusted under 35 U.S.C. 154(b) by 53 days.

(21) Appl. No.: 15/525,654

(22) PCT Filed: Jan. 18, 2016

(86) PCT No.: PCT/JP2016/000217
§ 371 (c)(1),
(2) Date: May 10, 2017

(87) PCT Pub. No.: WO2016/121321
PCT Pub. Date: Aug. 4, 2016

(65) Prior Publication Data
US 2017/0331108 A1    Nov. 16, 2017

(30) Foreign Application Priority Data

Jan. 28, 2015  (JP) .................................. 2015-014145

(51) Int. Cl.
*H01M 4/583*    (2010.01)
*H01M 4/38*    (2006.01)
(Continued)

(52) U.S. Cl.
CPC ........... *H01M 4/583* (2013.01); *H01M 4/134* (2013.01); *H01M 4/386* (2013.01); *H01M 4/62* (2013.01);
(Continued)

(58) Field of Classification Search
CPC ........... H01M 2004/027; H01M 4/386; H01M 4/134; H01M 2004/021; H01M 4/1395
See application file for complete search history.

(56) References Cited

U.S. PATENT DOCUMENTS 3,615,845 A * 10/1971 Gray ................... H01M 8/2484
429/513
3,969,139 A * 7/1976 Lai ......................... H01M 4/40
429/103
(Continued)

FOREIGN PATENT DOCUMENTS

CN 1674325 A 9/2005
CN 103313937 A 9/2013
(Continued)

OTHER PUBLICATIONS

International Search Report dated Apr. 19, 2016, issued in counterpart International Application No. PCT/JP2016/000217 (2 pages).
(Continued)

*Primary Examiner* — Imran Akram
(74) *Attorney, Agent, or Firm* — Westerman, Hattori, Daniels & Adrian, LLP

(57) ABSTRACT

A non-aqueous electrolyte secondary battery that contains a silicon material as a negative-electrode active material has improved initial charge/discharge efficiency. A negative-electrode active material particle (10) according to an embodiment contains a base particle (13), which includes a lithium silicate phase (11) represented by $Li_{2z}SiO_{(2+z)}$ $\{0<z<2\}$ and silicon particles (12) dispersed in the lithium silicate phase (11). The base particle (13) has a porosity of 25% or less, preferably 15% or less.

12 Claims, 2 Drawing Sheets

(51) Int. Cl.
 H01M 4/62 (2006.01)
 H01M 4/134 (2010.01)
 H01M 4/02 (2006.01)
(52) U.S. Cl.
 CPC ...... *H01M 4/625* (2013.01); *H01M 2004/027* (2013.01)

(56) References Cited

U.S. PATENT DOCUMENTS

| | | | | |
|---|---|---|---|---|
| 4,048,395 A | * | 9/1977 | Lai | H01M 4/0461 429/112 |
| 4,076,905 A | * | 2/1978 | Sammells | H01M 4/0461 429/112 |
| 2003/0053945 A1 | | 3/2003 | Fukuoka et al. | |
| 2005/0214644 A1 | | 9/2005 | Aramata et al. | |
| 2006/0057463 A1 | * | 3/2006 | Gao | H01M 4/387 429/231.95 |
| 2007/0122700 A1 | * | 5/2007 | Miyachi | H01M 4/13 429/218.1 |
| 2010/0216032 A1 | * | 8/2010 | Baba | H01M 10/0562 429/322 |
| 2011/0244333 A1 | | 10/2011 | Kawada | |
| 2012/0171560 A1 | * | 7/2012 | Xu | H01M 4/364 429/188 |
| 2013/0216907 A1 | * | 8/2013 | Rayner | B22F 9/04 429/211 |
| 2013/0224583 A1 | * | 8/2013 | Green | C01B 33/02 429/211 |
| 2013/0230769 A1 | * | 9/2013 | Xu | H01M 4/136 429/199 |
| 2014/0087250 A1 | * | 3/2014 | Coowar | C08F 8/44 429/211 |
| 2015/0037681 A1 | | 2/2015 | Morita et al. | |
| 2015/0188127 A1 | * | 7/2015 | Niimi | C01B 33/32 429/231.95 |
| 2015/0372294 A1 | | 12/2015 | Minami et al. | |
| 2016/0133918 A1 | * | 5/2016 | Xiao | H01M 4/0404 29/623.5 |
| 2016/0254525 A1 | | 9/2016 | Hirose et al. | |
| 2017/0331108 A1 | | 11/2017 | Minami et al. | |

FOREIGN PATENT DOCUMENTS

| | | | |
|---|---|---|---|
| CN | 103400971 A | 11/2013 | |
| JP | 2003-160328 A | 6/2003 | |
| JP | 2007-59213 A | 3/2007 | |
| JP | 2011-222151 A | 11/2011 | |
| JP | 2011-233245 A | 11/2011 | |
| JP | 2013-161705 A | 8/2013 | |
| JP | 2013-251097 A | 12/2013 | |
| JP | 2014-44899 A | 3/2014 | |
| JP | 2015-111547 A | 6/2015 | |
| WO | 2013/145108 A1 | 10/2013 | |
| WO | WO-2014034069 A1 * | 3/2014 | ............ C01B 33/32 |
| WO | 2014/119256 A1 | 8/2014 | |
| WO | 2016/121321 A1 | 8/2016 | |

OTHER PUBLICATIONS

English Translation of Search Report dated Aug. 19, 2019, issued in counteprart CN Application No. 201680005160.2 (3 pages).
Chinese Search Report dated May 18, 2020 for the related Chinese Patent Application No. 201680005160.2.

* cited by examiner

NEGATIVE-ELECTRODE ACTIVE MATERIAL FOR NON-AQUEOUS ELECTROLYTE SECONDARY BATTERY AND NON-AQUEOUS ELECTROLYTE SECONDARY BATTERY

TECHNICAL FIELD

The present disclosure relates to a negative-electrode active material for a non-aqueous electrolyte secondary battery and a non-aqueous electrolyte secondary battery.

BACKGROUND ART

It is known that more lithium ions per unit volume can be intercalated into silicon materials, such as silicon (Si) and silicon oxides represented by $SiO_x$, than into carbon materials, such as graphite. In particular, the volume change due to the intercalation of lithium ions is smaller in $SiO_x$ than in Si, and application of $SiO_x$ to a negative electrode of lithium-ion batteries has been investigated. For example, Patent Literature 1 discloses a non-aqueous electrolyte secondary battery that contains a mixture of $SiO_x$ and graphite as a negative-electrode active material.

However, non-aqueous electrolyte secondary batteries that contain $SiO_x$ as a negative-electrode active material have lower initial charge/discharge efficiency than non-aqueous electrolyte secondary batteries that contain graphite as a negative-electrode active material. This is mainly because $SiO_x$ is converted into $Li_4SiO_4$ (an irreversible reactant) in an irreversible reaction during charging and discharging. Thus, in order to suppress such an irreversible reaction and improve initial charge/discharge efficiency, a negative-electrode active material represented by $SiLi_xO_y$ (0<x<1.0, 0<y<1.5) is proposed (see Patent Literature 2). Patent Literature 3 discloses a negative-electrode active material containing a lithium silicate phase composed mainly of $Li_4SiO_4$ in silicon oxide.

CITATION LIST

Patent Literature

PTL 1: Japanese Published Unexamined Patent Application No. 2011-233245
PTL 2: Japanese Published Unexamined Patent Application No. 2003-160328
PTL 3: Japanese Published Unexamined Patent Application No. 2007-59213

SUMMARY OF INVENTION

Technical Problem

The techniques disclosed in Patent Literature 2 and Patent Literature 3 are aimed at improving the initial charge/discharge efficiency by heat-treating a mixture of $SiO_x$ and a lithium compound at high temperature to convert $SiO_2$ into an irreversible reactant $Li_4SiO_4$ in advance. In these processes, however, $SiO_2$ remains within a particle, and $Li_4SiO_4$ is famed only on the particle surface. A reaction within the particle requires another high-temperature process, and this process will increase the crystal grain sizes of Si and $Li_4SiO_4$. Such an increased crystal grain size results in an increased volume change of active material particles due to charging and discharging and reduced lithium ion conductivity, for example.

Solution to Problem

A negative-electrode active material for a non-aqueous electrolyte secondary battery according to one aspect of the present disclosure contains a base particle, which includes a lithium silicate phase represented by $Li_{2z}SiO_{(2+z)}$ {0<z<2} and silicon particles dispersed in the lithium silicate phase, wherein the base particle has a porosity of 25% or less before initial charging.

Advantageous Effects of Invention

One aspect of the present disclosure can improve the initial charge/discharge efficiency of a non-aqueous electrolyte secondary battery that contains a silicon material as a negative-electrode active material.

DESCRIPTION OF EMBODIMENTS

Figure 1:
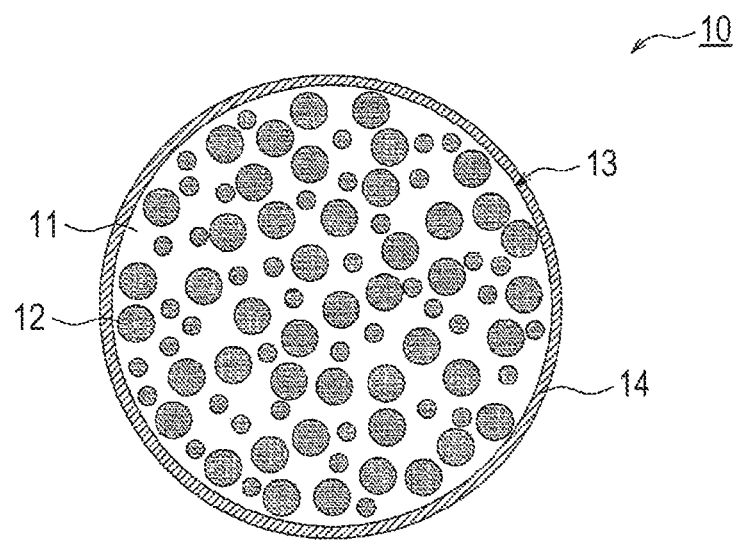
FIG. 1 is a schematic cross-sectional view of a negative-electrode active material according to an embodiment.

Embodiments of the present invention will be described in detail below.

The drawings referred to in the embodiments are schematically illustrated, and the dimensions of constituents in the drawings may be different from the actual dimensions of the constituents. Specific dimensions should be determined in consideration of the following description.

A negative-electrode active material according to one embodiment of the present disclosure includes a lithium silicate phase represented by $Li_{2z}SiO_{(2+z)}$ (0<z<2) and silicon particles dispersed in the lithium silicate phase. The lithium silicate phase and the silicon particles constitute a base particle, and the particle has a porosity of 25% or less. The silicon particles preferably have an average particle size of 200 nm or less. A negative-electrode active material according to one embodiment of the present disclosure may contain $SiO_2$ mostly in the form of a natural oxidation film on the surface of the silicon particles. $SiO_2$ in the form of a natural oxidation film is very different in characteristics from $SiO_2$ contained in known $SiO_x$ particles. For example, no $SiO_2$ peak is observed at 2θ=25 degrees in an XRD pattern obtained by XRD measurement of a negative-electrode active material according to one embodiment of the present disclosure. This is probably because the natural oxidation film is very thin and cannot diffract X-rays. By contrast, a $SiO_2$ peak is observed at 2θ=25 degrees in an XRD pattern of known $SiO_x$ particles.

In known $SiO_x$, fine Si particles are dispersed in a $SiO_2$ matrix, and the following reaction occurs during charging and discharging.

$$SiO_x(2Si+2SiO_2)+16Li^++16e^- \rightarrow 3Li_4Si+Li_4SiO_4 \quad (1)$$

The formula 1 is transformed into the following formulae in tams of Si and $2SiO_2$.

$$Si+4Li^++4e^- \rightarrow Li_4Si \quad (2)$$

$$2SiO_2+8Li^++8e^- \rightarrow Li_4Si+Li_4SiO_4 \quad (3)$$

As described above, the formula 3 is an irreversible reaction, and the formation of $Li_4SiO_4$ is primarily responsible for low initial charge/discharge efficiency.

A negative-electrode active material according to one embodiment of the present disclosure contains silicon particles dispersed in a lithium silicate phase represented by $Li_{2z}SiO_{(2+z)}$ ($0<z<2$) and has a much lower $SiO_2$ content than known $SiO_x$, for example. $SiO_2$ in the negative-electrode active material is a natural oxidation film and is very different in characteristics from $SiO_2$ contained in known $SiO_x$ particles. Thus, in a non-aqueous electrolyte secondary battery containing the negative-electrode active material, the reaction represented by the formula 3 is less likely to occur, and the initial charge/discharge efficiency is improved.

A negative-electrode active material according to one embodiment of the present disclosure has a particle structure in which silicon particles having a small particle size are dispersed in a lithium silicate phase, and can thereby have a reduced volume change associated with charging and discharging and can be less prone to the disintegration of the particle structure. Furthermore, a particle porosity of 25% or less can result in less disintegration of the particle structure originating from a void in the particle. A negative-electrode active material according to one embodiment of the present disclosure causes a smaller change in particle structure associated with charging and discharging than known $SiO_x$ particles. Thus, a non-aqueous electrolyte secondary battery containing a negative-electrode active material according to one embodiment of the present disclosure has high initial charge/discharge efficiency.

A non-aqueous electrolyte secondary battery according to an embodiment includes a negative electrode containing the negative-electrode active material, a positive electrode, and a non-aqueous electrolyte containing a non-aqueous solvent. Preferably, a separator is disposed between the positive electrode and the negative electrode. A non-aqueous electrolyte secondary battery according to an embodiment includes an electrode assembly and a non-aqueous electrolyte in a housing. The electrode assembly includes a roll of a positive electrode and a negative electrode with a separator interposed therebetween. Alternatively, another electrode assembly, such as a layered electrode assembly, may be used instead of the wound electrode assembly. The layered electrode assembly includes a positive electrode and a negative electrode stacked with a separator interposed therebetween. The non-aqueous electrolyte secondary battery may be of any type, for example, of a cylindrical, square or rectangular, coin, button, or laminate type.

[Positive Electrode]

Preferably, the positive electrode includes a positive-electrode current collector, for example, famed of metal foil, and a positive-electrode mixture layer disposed on the current collector. The positive-electrode current collector can be formed of foil of a metal stable in the electric potential range of the positive electrode, such as aluminum, or a film having a surface layer famed of the metal. The positive-electrode mixture layer preferably contains an electrically conductive agent and a binder as well as a positive-electrode active material. The particles of the positive-electrode active material may be covered with fine particles of an oxide, such as aluminum oxide ($Al_2O_3$), or of an inorganic compound, such as a phosphoric acid compound or a boric acid compound.

The positive-electrode active material may be a lithium transition metal oxide containing at least one transition metal element, such as Co, Mn, and/or Ni. For example, the lithium transition metal oxide may be $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2+y}M_yO_4$, $LiMPO_4$, or $Li_2MPO_4F$ (M: at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used alone or in combination.

The electrically conductive agent is used to increase the electrical conductivity of the positive-electrode mixture layer. The electrically conductive agent may be a carbon material, such as carbon black, acetylene black, ketjen black, or graphite. These may be used alone or in combination.

The binder is used to maintain good contact between the positive-electrode active material and the electrically conductive agent and improve the binding property of the positive-electrode active material on the surface of the positive-electrode current collector. The binder may be a fluoropolymer, such as polytetrafluoroethylene (PTFE) or poly(vinylidene fluoride) (PVdF), polyacrylonitrile (PAN), polyimide resin, acrylic resin, or polyolefin resin. These resins may be used in combination with carboxymethylcellulose (CMC) or a salt thereof (such as CMC-Na, CMC-K, or CMC-$NH_4$, or a partially neutralized salt thereof) or poly(ethylene oxide) (PEO). These may be used alone or in combination.

[Negative Electrode]

Preferably, the negative electrode includes a negative-electrode current collector, for example, formed of metal foil, and a negative-electrode mixture layer disposed on the current collector. The negative-electrode current collector can be formed of foil of a metal stable in the electric potential range of the negative electrode, such as copper, or a film having a surface layer famed of the metal. The negative-electrode mixture layer preferably contains a binder as well as a negative-electrode active material. As in the positive electrode, the binder can be a fluoropolymer, PAN, polyimide resin, acrylic resin, or polyolefin resin. In the preparation of a mixture slurry with an aqueous solvent, preferably used is CMC or a salt thereof (such as CMC-Na, CMC-K, or CMC-$NH_4$, or a partially neutralized salt thereof), styrene-butadiene rubber (SBR), poly(acrylic acid) (PAA) or a salt thereof (such as PAA-Na or PAA-K, or a partially neutralized salt thereof), or poly(vinyl alcohol) (PVA).

FIG. 1 is a cross-sectional view of a negative-electrode active material particle 10 according to an embodiment.

As illustrated in FIG. 1, the negative-electrode active material particle 10 includes a lithium silicate phase 11 and silicon particles 12 dispersed in the phase. $SiO_2$ in the negative-electrode active material particle 10 is mostly in the form of a natural oxidation film. Preferably, no $SiO_2$ peak is observed at $2\theta=25$ degrees in an XRD pattern obtained by XRD measurement of the negative-electrode active material particle 10. The lithium silicate phase 11 and the silicon particles 12 constitute a base particle 13, which is preferably covered with an electrically conductive layer 14.

The base particle 13 may contain a third component in addition to the lithium silicate phase 11 and the silicon particles 12. The amount of $SiO_2$, if any, in the form of a natural oxidation film contained in the base particle 13 is preferably less than 10% by mass, more preferably less than 7% by mass. A smaller size of the silicon particles 12 results in a larger surface area of the silicon particles 12 and more $SiO_2$ in the form of a natural oxidation film.

More lithium ions can be intercalated into the silicon particles 12 of the negative-electrode active material particle 10 than into carbon materials, such as graphite. Thus, use of the negative-electrode active material particles 10 in the negative-electrode active material contributes to increased capacity of the battery. The negative-electrode mixture layer may contain the negative-electrode active material particles 10 alone as a negative-electrode active material. However, since the volume change due to charging and discharging is greater in the silicon material than in graphite, another active material that suffers a smaller volume change due to charging and discharging may also be used to increase capacity while maintaining good cycle characteristics. The other active material is preferably a carbon material, such as graphite.

The graphite may be graphite conventionally used as a negative-electrode active material, for example, natural graphite, such as flake graphite, bulk graphite, or earthy graphite, or artificial graphite, such as massive artificial graphite (MAG) or graphitized mesophase carbon microbeads (MCMB). If graphite is used in combination, the mass ratio of the negative-electrode active material particles 10 to graphite preferably ranges from 1:99 to 30:70. At a mass ratio of the negative-electrode active material particles 10 to graphite within this range, both higher capacity and improved cycle characteristics can be more easily achieved. When the ratio of the negative-electrode active material particles 10 to graphite is less than 1% by mass, this reduces the advantages of the addition of the negative-electrode active material particles 10 to increase capacity.

The lithium silicate phase 11 is famed of a lithium silicate represented by $Li_{2z}SiO_{(2+z)}$ (0<z<2). In other words, $Li_4SiO_4$ (Z=2) does not constitute the lithium silicate phase 11. $Li_4SiO_4$ is an unstable compound, reacts with water and becomes alkaline, and thereby modifies Si and reduces charge/discharge capacity. The lithium silicate phase 11 is preferably composed mainly of $Li_2SiO_3$ (Z=1) or $Li_2Si_2O_5$ (Z=½) in terms of stability, manufacturability, and lithium ion conductivity. When $Li_2SiO_3$ or $Li_2Si_2O_5$ is a main component (a component with the largest mass), the main component content is preferably more than 50% by mass, more preferably 80% or more by mass, of the total mass of the lithium silicate phase 11.

The lithium silicate phase 11 is preferably composed of fine particles. For example, the lithium silicate phase 11 is composed of particles finer than the silicon particles 12. In an XRD pattern of the negative-electrode active material particle 10, for example, the (111) peak intensity of Si is higher than the (111) peak intensity of a lithium silicate.

The negative-electrode active material particles 10 after charging and discharging preferably contain no $Li_4SiO_4$. Since $SiO_2$ in the starting material of the negative-electrode active material particles 10 is mostly in the form of a natural oxidation film, the reaction represented by the formula (3) is less likely to occur in initial charging and discharging, and the irreversible reactant $Li_4SiO_4$ is negligibly formed.

Preferably, the silicon particles 12 are almost uniformly dispersed in the lithium silicate phase 11. For example, the negative-electrode active material particle 10 (the base particle 13) has a sea-island structure in which fine silicon particles 12 are dispersed in a lithium silicate matrix, and the silicon particles 12 are not localized in a particular region and are almost uniformly distributed in any cross section of the negative-electrode active material particle 10 (the base particle 13). The amount of the silicon particles 12 (Si) in the base particle 13 preferably ranges from 20% to 95% by mass, more preferably 35% to 75% by mass, of the total mass of the base particle 13 in terms of higher capacity and improved cycle characteristics. An excessively low Si content may result in decreased charge/discharge capacity and poor load characteristics due to insufficient diffusion of lithium ions. An excessively high Si content may cause deterioration of cycle characteristics because part of Si is not covered with a lithium silicate, and exposed Si comes into contact with an electrolyte solution.

The silicon particles 12 may have an average particle size of 500 nm or less, preferably 200 nm or less, more preferably 50 nm or less, before initial charging. After charging and discharging, 400 nm or less is preferred, and 100 nm or less is more preferred. A decrease in the size of the silicon particles 12 results in a smaller volume change during charging and discharging and makes it easier to suppress the disintegration of the electrode structure. The average particle size of the silicon particles 12 is determined by observing a cross section of the negative-electrode active material particle 10 with a scanning electron microscope (SEM) or a transmission electron microscope (TEM). More specifically, the average particle size of the silicon particles 12 is determined by averaging the longest diameters of 100 of the silicon particles 12.

In the base particle 13, for example, the ratio of the area of silicon particles having a particle size of 20 nm or more to the area occupied by all the silicon particles in a cross section of the base particle 13 (hereinafter referred to as the "particle size ratio L") is 20% or more. The particle size ratio L can be determined by measuring the area of silicon particles 12 having a particle size of 20 nm or more by a method similar to the method described later for porosity (the particle size ratio L=the area of the silicon particles 12 having a particle size of 20 nm or more×100/the total area of the silicon particles 12). For example, the particle size ratio L before initial charging ranges from 20% to 60%.

The base particle 13 has a porosity of 25% or less. The team "porosity", as used herein, refers to the ratio of the area of voids to the total area of the base particle 13 in a cross section of the particle and can be determined by SEM observation of the cross section of the particle. A specific method for measuring porosity will be described below. (1) A cross section of the base particle 13 is exposed with an ion milling system manufactured by Hitachi High-Technologies Corporation (for example, IM4000). (2) The exposed cross section of the particle is observed with a SEM. The ratio of the area of voids to the total cross-sectional area of the particle is determined to calculate porosity (the area of voids×100/the total cross-sectional area of the particle). The porosity is the average value of 10 particles.

As described above, a particle porosity of 25% or less can result in less disintegration of the particle structure originating from a void in the particle during charging and discharging.

The base particle 13 preferably has a porosity of 25% or less at least before initial charging. The base particle 13 preferably has a porosity 15% or less, more preferably 10% or less, particularly preferably 8% or less, before initial charging. The base particle 13 may have a porosity of more than 25% after initial charging and discharging and preferably has a porosity of 40% or less after 100 cycles, for example.

The negative-electrode active material particles 10 preferably have an average particle size in the range of 1 to 15 µm, more preferably 4 to 10 µm, in terms of higher capacity and improved cycle characteristics. The average particle size of the negative-electrode active material particles 10 is the size of primary particles and refers to the particle size at which the integrated volume is 50% in the particle size distribution measured by a laser diffraction scattering method (for example, with "LA-750" manufactured by Horiba, Ltd.) (the volume-average particle size). When the negative-electrode active material particles 10 have an excessively small average particle size, this tends to result in decreased capacity due to an increased surface area and an enhanced reaction with an electrolyte. On the other hand, when the negative-electrode active material particles 10 have an excessively large average particle size, this tends to result in an increased volume change due to charging and discharging and the deterioration of cycle characteristics. Although the negative-electrode active material particle 10 (the base particle 13) is preferably covered with the electrically conductive layer 14, the electrically conductive layer 14 has a small thickness and has little effect on the average particle size of the negative-electrode active material particle 10 (the particle size of the negative-electrode active material particle 10 is almost equal to the particle size of the base particle 13).

The base particles 13 can be manufactured through the following steps 1 to 4, for example. These steps are performed in an inert atmosphere.

(1) A ground Si powder and a ground lithium silicate powder each having an average particle size in the range of several to tens of micrometers are mixed at a predetermined mass ratio to prepare a mixture.

(2) The mixture is then ground in a ball mill for micronization. Alternatively, their raw powders subjected to micronization in advance may be used to prepare the mixture.

(3) The ground mixture is then compressed at a predetermined pressure. The pressure to be applied is preferably 10 MPa or more, more preferably 40 MPa or more. In this case, the temperature preferably ranges from 600° C. to 1000° C. For example, a hot press can be used in this step. Lithium silicates represented by $Li_{2z}SiO_{(2+z)}$ (0<z<2) are stable in this temperature range and do not react with Si. Thus, the capacity is not decreased.

(4) The compressed mixture is then ground to a predetermined particle size and, if necessary, is sieved, thus forming the base particles 13.

Alternatively, Si nanoparticles and lithium silicate nanoparticles may be synthesized without a ball mill and may be mixed and heat-treated to prepare the base particles 13.

The negative-electrode active material particle 10 preferably includes the electrically conductive layer 14 on its surface. The electrically conductive layer 14 is formed of a material having higher electrical conductivity than the lithium silicate phase 11 surrounding the silicon particles 12. The electrically conductive agent of the electrically conductive layer 14 is preferably electrochemically stable and is preferably at least one selected from the group consisting of carbon materials, metals, and metallic compounds. As in the electrically conductive agent in the positive-electrode mixture layer, the carbon materials may be carbon black, acetylene black, ketjen black, graphite, and a mixture of at least two of these materials. The metals may be copper, nickel, and alloys thereof that are stable in the electric potential range of the negative electrode. The metallic compounds may be copper compounds and nickel compounds (a metal or metallic compound layer can be famed on the base particle 13, for example, by electroless plating). Among these, the carbon materials are particularly preferred.

A method for covering the base particles 13 with carbon may be a CVD method using acetylene and/or methane or a method of mixing coal pitch, petroleum pitch, and/or a phenolic resin with the base particles 13 and heat-treating the mixture. Alternatively, carbon black and/or ketjen black may be adhered to the base particles 13 with a binder to form a carbon covering layer.

The electrically conductive layer 14 preferably almost entirely covers the base particle 13. The electrically conductive layer 14 preferably has a thickness in the range of 1 to 200 nm, more preferably 5 to 100 nm, in terms of electrical conductivity and the diffusion of lithium ions in the base particle 13. The electrically conductive layer 14 having an excessively small thickness has lower electrical conductivity and has difficulty in uniformly covering the base particle 13. On the other hand, the electrically conductive layer 14 having an excessively large thickness tends to prevent the diffusion of lithium ions into the base particle 13 and decrease capacity. The thickness of the electrically conductive layer 14 can be determined by the cross-sectional observation of particles with SEM or TEM.

[Non-Aqueous Electrolyte]

The non-aqueous electrolyte contains a non-aqueous solvent and an electrolyte salt dissolved in the non-aqueous solvent. The non-aqueous electrolyte is not limited to a liquid electrolyte (non-aqueous electrolytic solution) and may be a solid electrolyte containing a gel polymer. The non-aqueous solvent may be an ester, ether, nitrile, such as acetonitrile, amide, such as dimethylformamide, or a mixed solvent of at least two of these solvents. The non-aqueous solvent may contain a halogen substitution product of these solvents, in which at least part of hydrogens of the solvents are substituted with a halogen atom, such as fluorine.

Examples of the ester include cyclic carbonates, such as ethylene carbonate (EC), propylene carbonate (PC), and butylene carbonate, chain carbonates, such as dimethyl carbonate (DMC), methyl ethyl carbonate (EMC), diethyl carbonate (DEC), methyl propyl carbonate, ethyl propyl carbonate, and methyl isopropyl carbonate, cyclic carboxylates, such as γ-butyrolactone (GBL) and γ-valerolactone (GVL), and chain carboxylates, such as methyl acetate, ethyl acetate, propyl acetate, methyl propionate (MP), ethyl propionate, and γ-butyrolactone.

Examples of the ether include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

The halogen substitution product is preferably a fluorinated cyclic carbonate, such as fluoroethylene carbonate (FEC), a fluorinated chain carbonate, or a fluorinated chain carboxylate, such as fluoropropionic acid methyl (FMP).

The electrolyte salt is preferably a lithium salt. Examples of the lithium salt include $LiBF_4$, $LiClO_4$, $LiPF_6$, $LiAsF_6$, LiSbF$_6$, LiAlCl$_4$, LiSCN, LiCF$_3$SO$_3$, LiCF$_3$CO$_2$, Li(P(C$_2$O$_4$)F$_4$), LiPF$_{6-x}$(C$_n$F$_{2n+1}$)$_x$ (1<x<6, n is 1 or 2), LiB$_{10}$Cl$_{10}$, LiCl, LiBr, LiI, chloroborane lithium, lower aliphatic carboxylic acid lithium, borates, such as Li$_2$B$_4$O$_7$ and Li(B(C$_2$O$_4$)F$_2$), and imide salts, such as LiN(SO$_2$CF$_3$)$_2$ and LiN(C$_l$F$_{2l+1}$SO$_2$)(C$_m$F$_{2m+1}$SO$_2$) {l and m are integers of 1 or more}. These lithium salts may be used alone or in combination. Among these, LiPF$_6$ is preferred in terms of ionic conductivity and electrochemical stability. The concentration of lithium salt preferably ranges from 0.8 to 1.8 moles per liter of the non-aqueous solvent.

[Separator]

The separator may be an ion-permeable insulating porous sheet. Specific examples of the porous sheet include microporous thin films, woven fabrics, and nonwoven fabrics. The material of the separator is preferably an olefin resin, such as polyethylene or polypropylene, or cellulose. The separator may be a laminate of a cellulose fiber layer and a thermoplastic fiber layer, such as an olefin resin.

EXAMPLES

Although the present disclosure will be further described in the following examples, the present disclosure is not limited to these examples.

Example 1

[Production of Negative-Electrode Active Material]

A Si powder (3N, 10 µm ground product) and a Li$_2$SiO$_3$ powder (10 µm ground product) were mixed at a mass ratio of 50:50 in an inert atmosphere and were charged into a pot (made of SUS, volume: 500 mL) of a planetary ball mill (P-5 manufactured by Fritsch). The pot was charged with 24 balls made of SUS (diameter: 20 mm) and was closed. The mixed powder was ground at 200 rpm for 50 hours. The powder was then removed in an inert atmosphere and was heat-treated with a hot press at a pressure of 200 MPa and at a temperature of 800° C. in an inert atmosphere for 4 hours. The heat-treated powder was ground, was passed through a 40-µm mesh sieve, was mixed with coal pitch (MCP250 manufactured by JFE Chemical Corporation), and was heat-treated in an inert atmosphere at a temperature of 800° C. to be covered with carbon, thus forming an electrically conductive layer. The carbon coverage was 5% by mass of the total mass of the particles each containing the base particle and the electrically conductive layer. The average particle size was adjusted to be 5 µm with a sieve. Thus, a negative-electrode active material was produced.

[Analysis of Negative-Electrode Active Material]

Figure 2:
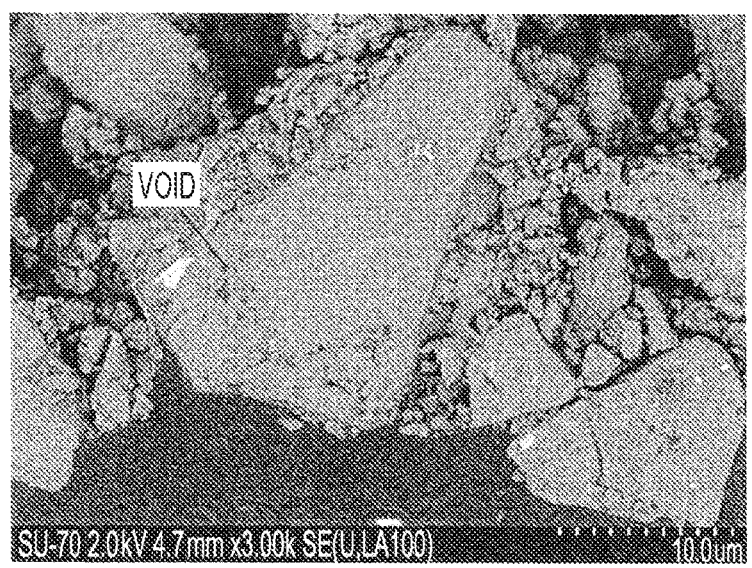
FIG. 2 is an electron micrograph of a cross section of a particle of a negative-electrode active material according to an embodiment.

A TEM observation of a cross section of the resulting negative-electrode active material showed that the Si particles have an average particle size of less than 50 nm. A SEM observation of a cross section of the negative-electrode active material showed that Si particles are almost uniformly dispersed in a Li$_2$SiO$_3$ matrix. The base particles of the negative-electrode active material have a porosity of 1% and a particle size ratio L of 39%. Peaks mainly attributed to Si and Li$_2$SiO$_3$ were observed in an XRD pattern (see FIG. 2) of the negative-electrode active material. The peak intensity was Si>Li$_2$SiO$_3$. No SiO$_2$ peak was observed at 2θ=25 degrees. A Si-NMR measurement of the negative-electrode active material showed that the SiO$_2$ content was less than 7% by mass (below the minimum limit of detection).

[Preparation of Negative Electrode]

The negative-electrode active material and polyacrylonitrile (PAN) were then mixed at a mass ratio of 95:5. After N-methyl-2-pyrrolidone (NMP) was added to the mixture, the mixture was stirred in a mixer (Thinky Mixer manufactured by Thinky Corporation) to prepare a negative-electrode mixture slurry. The slurry was then applied to one side of a copper foil such that the mass of the negative-electrode mixture layer was 25 g/m$^2$, was dried in air at 105° C., and was rolled. Thus, a negative electrode was prepared. The negative-electrode mixture layer had a density of 1.50 g/cm$^3$.

[Preparation of Non-Aqueous Electrolytic Solution]

Ethylene carbonate (EC) and diethyl carbonate (DEC) were mixed at a volume ratio of 3:7. LiPF$_6$ was added to this mixed solvent such that the concentration of LiPF$_6$ was 1.0 mol/L. Thus, a non-aqueous electrolytic solution was prepared.

[Manufacture of Non-Aqueous Electrolyte Secondary Battery]

In an inert atmosphere, the negative electrode and a lithium metal foil each having a Ni tab were oppositely disposed with a polyethylene separator interposed therebetween to prepare an electrode assembly. The electrode assembly was placed in a battery housing formed of an aluminum laminated film. The non-aqueous electrolytic solution was poured into the battery housing, and the battery housing was sealed. Thus, a battery was manufactured.

Example 2

A negative-electrode active material and a battery were manufactured in the same manner as in Example 1 except that the heat treatment with the hot press was performed at a pressure of 100 MPa.

Example 3

A negative-electrode active material and a battery were manufactured in the same manner as in Example 2 except that the heat treatment with the hot press was performed at a temperature of 600° C.

Example 4

A negative-electrode active material and a battery were manufactured in the same manner as in Example 3 except that the heat treatment with the hot press was performed at a pressure of 40 MPa.

Example 5

A negative-electrode active material and a battery were manufactured in the same manner as in Example 4 except that only a pressure of 40 MPa was applied with the hot press (at low temperature).

Example 6

A negative-electrode active material and a battery were manufactured in the same manner as in Example 5 except that the pressure applied to the powder was 10 MPa.

Example 7

A negative-electrode active material and a battery were manufactured in the same manner as in Example 2 except that the heat treatment with the hot press was performed at a pressure of 200 MPa and at a temperature of 600° C.

Example 8

A negative-electrode active material and a battery were manufactured in the same manner as in Example 2 except that the heat treatment with the hot press was performed at a pressure of 300 MPa and at a temperature of 500° C.

Comparative Example 1

A negative-electrode active material B3 and a battery R3 were manufactured in the same manner as in Example 3 except that no pressure was applied in the heat treatment with the hot press.

Figure 3:
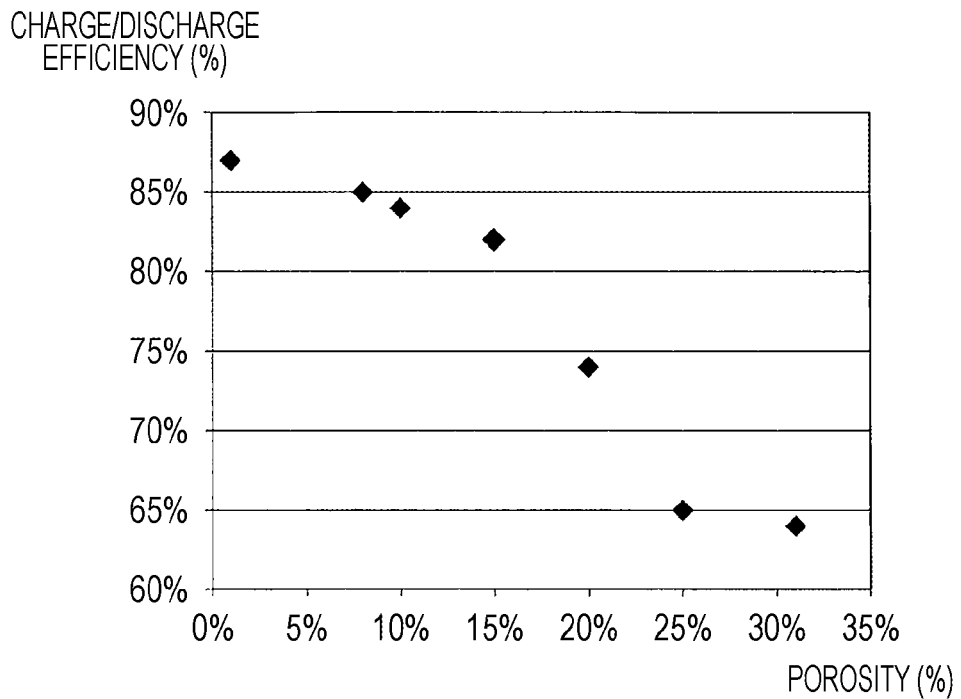
FIG. 3 is a graph showing the relationship between the porosity of a negative-electrode active material according to an embodiment and the initial charge/discharge efficiency of a non-aqueous electrolyte secondary battery containing the negative-electrode active material.
Figure 4:
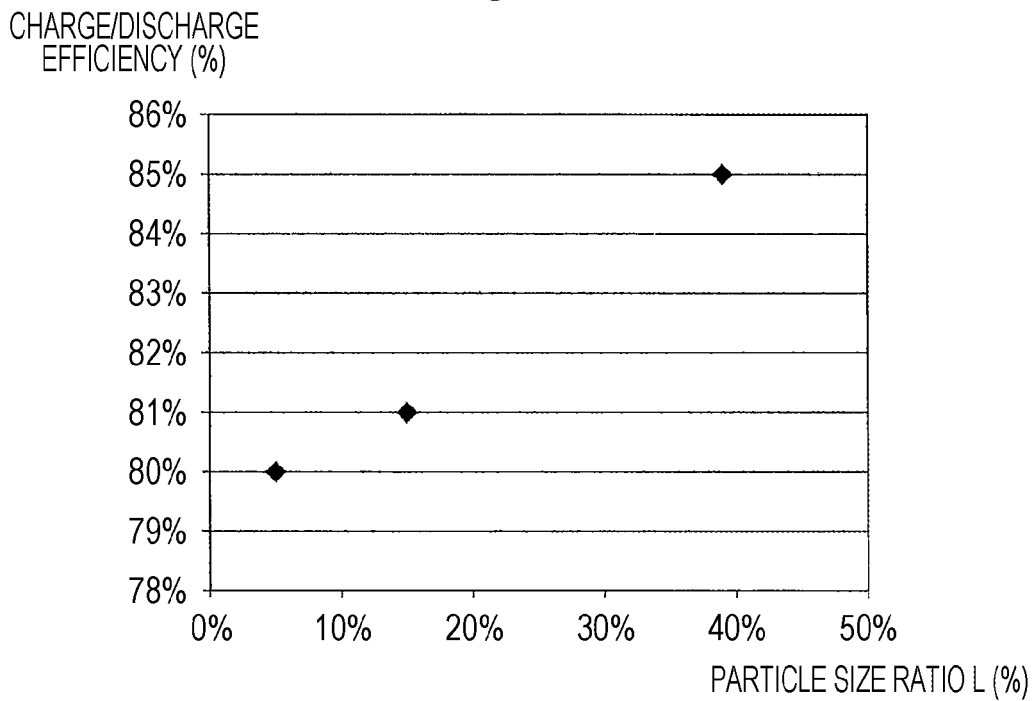
FIG. 4 is a graph showing the relationship between the area ratio of silicon particles having a particle size of 20 nm or more in a cross section of a particle of a negative-electrode active material according to an embodiment and the initial charge/discharge efficiency of a non-aqueous electrolyte secondary battery containing the negative-electrode active material.

For the negative-electrode active materials of Examples 1 to 8 and Comparative Example 1, the ratio and porosity of silicon particles having a large particle size were measured by the following method, and the initial charge/discharge efficiency of each battery was determined by the following method. Table 1 and FIGS. 3 and 4 show the results.

[Determining the Ratio of Silicon Particles Having Large Particle Size]

(1) A cross section of a particle of a negative-electrode active material is exposed with an ion milling system manufactured by Hitachi High-Technologies Corporation (for example, IM4000).

(2) A backscattered electron image of the exposed cross section of the particle was taken with a SEM. The ratio of the area of silicon particles having a particle size of 20 nm or more to the area occupied by all the silicon particles in the cross section of the particle was determined to calculate the particle size ratio L (the area of silicon particles having a particle size of 20 nm or more×100/the total cross-sectional area of the silicon particles). Silicon particles, silicates, other particles, and voids were distinguished from each other with image analysis software (Imege Pro available from Planetron Inc.) on the basis of the difference in their brightness and were measured in terms of particle size and cross-sectional area. The particle size ratio L was the average value of 1000 silicon particles.

[Porosity Measurement]

(1) A cross section of a particle of a negative-electrode active material is exposed with an ion milling system manufactured by Hitachi High-Technologies Corporation (for example, IM4000).

(2) A backscattered electron image of the exposed cross section of the particle was taken with a SEM. The ratio of the area of voids to the total cross-sectional area of the particle was determined to calculate porosity (the area of voids×100/the total cross-sectional area of the particle). The porosity was the average value of 10 particles.

[Initial Charge/Discharge Efficiency]

Charging

Constant-current charging at an electric current of 0.2 It to a voltage of 0 V was followed by constant-current charging at an electric current of 0.05 It to a voltage of 0 V.

Discharging

Constant-current discharging was performed at an electric current of 0.2 It to a voltage of 1.0 V.

Rest

The rest period between the charging and discharging was 10 minutes.

The ratio of discharge capacity to charge capacity in the first cycle was considered to be initial charge/discharge efficiency.

Initial charge/discharge efficiency (%)=discharge capacity in first cycle/charge capacity in first cycle×100

TABLE 1

| | Temperature (° C.) | Pressure (MPa) | Particle size ratio L | Porosity | Charge/discharge efficiency |
|---|---|---|---|---|---|
| Example 1 | 800 | 200 | 26% | 1% | 87% |
| Example 2 | 800 | 100 | 39% | 8% | 85% |
| Example 3 | 600 | 100 | 22% | 10% | 84% |
| Example 4 | 600 | 40 | 29% | 15% | 82% |
| Example 5 | — | 40 | 21% | 20% | 74% |
| Example 6 | — | 10 | 25% | 25% | 65% |
| Example 7 | 600 | 200 | 15% | 8% | 81% |
| Example 8 | 500 | 300 | 5% | 8% | 80% |
| Comparative example 1 | 600 | 0 | 39% | 31% | 64% |

Table 1 and FIG. 3 show that the batteries of the examples have higher initial charge/discharge efficiency than the battery of the comparative example. More specifically, the use of the negative-electrode active material having a particle porosity of 25% or less results in higher initial charge/discharge efficiency than the use of the negative-electrode active material having a particle porosity of more than 25%. The batteries containing the negative-electrode active material having a particle porosity of 15% or less have particularly high initial charge/discharge efficiency (see Examples 1 to 5). Furthermore, as shown in Table 1 and FIG. 4, for the same porosity, the initial charge/discharge efficiency increases with the particle size ratio L; in particular, a particle size ratio L of 20% or more results in great improvement.

REFERENCE SIGNS LIST

10 negative-electrode active material particle, 11 lithium silicate phase, 12 silicon particles, 13 base particle, 14 electrically conductive layer

The invention claimed is:

1. A non-aqueous electrolyte secondary battery, comprising:
   a negative electrode with a negative-electrode active material including a base particle; a non-aqueous electrolyte; and a positive electrode;
   and, wherein the base particle comprises:
   a lithium silicate phase represented by $Li_{2z}SiO_{(2+z)}$ $\{0<z<2\}$ and
   silicon particles are uniformly dispersed in a matrix of the lithium silicate phase,
   wherein the base particle has a porosity of 25% or less before initial charging, and
   wherein within the negative-electrode active material an area of particles having a particle size of 20 nm or more out of the silicon particles in a cross section of the base particle is 20% or more of an area occupied by the silicon particles before initial charging.

2. The non-aqueous electrolyte secondary battery according to claim 1, wherein the base particle has a porosity of 15% or less before initial charging.

3. The non-aqueous electrolyte secondary battery according to claim 1, wherein no $SiO_2$ peak is observed at $2\theta=25$ degrees in an XRD pattern obtained by XRD measurement in the negative-electrode active material.

4. The non-aqueous electrolyte secondary battery according to claim 3, wherein the lithium silicate phase is composed mainly of $Li_2SiO_3$.

5. The non-aqueous electrolyte secondary battery according to claim 4, wherein the negative-electrode active material after charging and discharging contains no $Li_4SiO_4$.

6. The non-aqueous electrolyte secondary battery according to claim 3, wherein the negative-electrode active material after charging and discharging contains no $Li_4SiO_4$.

7. The non-aqueous electrolyte secondary battery according to claim 1, wherein the base particle is covered with an electrically conductive layer.

8. The non-aqueous electrolyte secondary battery according to claim 1, wherein the silicon particles have an average particle size of 200 nm or less before initial charging.

9. The a non-aqueous electrolyte secondary battery according to claim 1, wherein the lithium silicate phase is composed mainly of $Li_2SiO_3$.

10. The non-aqueous electrolyte secondary battery according to claim 1, wherein the lithium silicate phase is composed mainly of $Li_2Si_2O_5$.

11. The non-aqueous electrolyte secondary battery according to claim 1, wherein the negative-electrode active material after charging and discharging contains no $Li_4SiO_4$.

12. The non-aqueous electrolyte secondary battery according to claim 1,
wherein the non-aqueous electrolyte is at least one of the group consisting of: a non-aqueous solvent with an electrolyte salt dissolved in the non-aqueous solvent and a solid electrolyte containing a gel polymer.

* * * * *